3,423,168
CESIUM DIFLUOROCHLORATE AND PROCESS
FOR PRODUCING SAME
Dale K. Huggins, Convent Station, and William B. Fox, Morristown, N.J., assignors to Allied Chemical Corporation, New York, N.Y., a corporation of New York
No Drawing. Filed Sept. 15, 1966, Ser. No. 580,563
U.S. Cl. 23—50        6 Claims
Int. Cl. C01d 11/00

ABSTRACT OF THE DISCLOSURE

Cesium difluorochlorate ($CsClO_2F_2$) is prepared by reacting an activated cesium fluoride with chloryl fluoride under anhydrous conditions. The activated cesium fluoride may be obtained by decomposition of a cesium-hexafluoroacetone adduct having the formula $$Cs^+OCF(CF_3)_2^-$$

and also by pulverization of cesium fluoride.

---

The syntheses of various compounds containing the difluorochlorate anion, $ClO_2F_2^-$, and different cations, including sodium, potassium and barium cations, by dissolving the corresponding chlorate in aqueous hydrofluoric acid solutions have been reported in the literature. However, subsequent attempts to reproduce these results have been unsuccessful and elemental, infrared and X-ray analyses of products prepared by these methods have failed to reveal evidence for the existence of these difluorochlorate salts, previously reported to have been prepared in the literature. Other experiments directed to the preparation of the adduct $CsClO_2F_2$ by the direct combination of chloryl fluoride and cesium fluoride at temperatures as high as 220° C. have been attempted but these experiments give no evidence to indicate formation of a stable cesium difluorochlorate adduct of the formula $CsClO_2F_2$.

It has now been found that a stable cesium difluorochlorate adduct having the formula $CsClO_2F_2$ may be prepared in relatively high yields by reaction of chloryl fluoride and cesium fluoride under anhydrous conditions provided that the cesium fluoride is activated prior to its employment as a reactant in the process. The cesium difluorochlorate adduct formed in the process of the present invention is a colorless, crystalline solid which explodes upon contact with water and may be further characterized by its dissociation into the cesium fluoride and chloryl fluoride reactants, respectively, when heated to a temperature of 100° C. for a period of one hour.

Although a stoichiometric molar ratio of one mole of chloryl fluoride per mole of activated cesium fluoride may be employed in the process of the present invention, it is generally desirable to employ excess molar quantities of the chloryl fluoride reactant to ensure complete conversion of the cesium fluoride reactant to the desired adduct. Accordingly, it is preferred to employ a molar ratio of about 1.1 and 3.0 moles of chloryl fluoride per mole of cesium fluoride. Larger amounts of chloryl fluoride may also be used but no additional benefits may be realized thereby.

The reaction of the present invention may be conducted at any temperature below decomposition temperature of the chloryl fluoride reactant. In general, any temperature that will provide a reasonable rate of formation of the cesium difluorochlorate adduct may be employed and although there is no maximum static pressure obtainable above which the cesium difluorochlorate adduct may not be prepared, it is desirable to maintain the vapor pressure of the chloryl fluoride reactant above the dissociation pressure of the cesium difluorochlorate adduct at any given temperature. These conditions indicate that operable reaction temperatures and pressures employable in the present process may range from about −100° to +200° C. and from about 0.1 millimeter Hg (absolute) to about 1,500 atmospheres for formation of the desired cesium difluorochlorate adduct. The optimum conditions for preparation of the cesium difluorochlorate adduct are a temperature of −30° to +25° C. and sufficient pressure to ensure at least a portion of the chloryl fluoride reactant in the liquid state.

In conducting the process of the present invention, it is essential to employ rigorously anhydrous conditions. Gross amounts of water will cause the desired cesium difluorochlorate adduct to explode while trace amounts of moisture will cause decomposition of the adduct and of chloryl fluoride as well as destruction of the cesium fluoride thereby precluding formation of the adduct. It is additionally required to activate the cesium fluoride reactant prior to its contacting with the chloryl fluoride reactant. Any method conventionally employed in the activation of catalysts may be used in the activation of the cesium fluoride reactant used in the present process. Accordingly, commercially available cesium fluoride may be pulverized in a ball mill thereby producing an extremely finely divided and activated cesium fluoride. Alternatively, the commercially available cesium fluoride may be contacted with treating agents thereby exposing fresh and uncontaminated surfaces of the cesium fluoride for reaction with the chloryl fluoride reactant. When the cesium fluoride is activated by pulverization, it is generally desirable to pulverize the commercially available cesium fluoride material for a time sufficient to obtain an activated cesium fluoride material having a particle size below about 10 microns, preferably in the range of 0.5 to 5 microns, in diameter.

A preferred method of activation of the cesium fluoride involves forming a slurry of the anhydrous commercially available cesium fluoride in a liquid medium which is a solvent or partial solvent therefor in a reaction vessel which is maintained at subatmospheric pressures. Suitable liquid media which can be used are lower alkyl nitriles such as acetonitrile, lower alkyl t-amides such as dimethyl formamide, nitrobenzene, butyrolactone, sulfolanes such as 2-methylsulfolane and sulfones such as methylethyl sulfone. Thereafter, a perhalogenated ketone, such as hexafluoroacetone, is slowly added as a vapor thereby causing the cesium fluoride to gradually dissolve in the liquid medium and form a soluble cesium perhaloketone salt; for example, when hexafluoroacetone is employed as the perhalogenated ketone, the corresponding cesium salt having the formula $Cs^+OCF(CF_3)_2^-$ would be formed. Introduction of the perhalogenated ketone is discontinued when the ketone is no longer absorbed; at this point all of the solids are in solution. The solvent and excess perhalogenated ketone are then removed under vacuum and the solid perhalogenated cesium ketone salt remaining is heated to a temperature of from at least 80° to 100° C. at a pressure of 0.1 to 0.025 mm. Hg, absolute, to liberate the perhalogenated ketone and leave behind a finely divided active cesium fluoride having a particle size in the range of about 1 to 5 microns which is particularly suitable for reaction with the chloryl fluoride in the present process.

The chloryl fluoride reactant employed in the process of the present invention may be prepared by passing chlorine dioxide over silver fluoride as is more fully described by Schmeisser et al., Angew Chem., vol. 69, p. 780 (1957). Alternatively, the chloryl fluoride reactant may be prepared by reaction of chlorine trifluoride with potassium chlorate as is described by Smith et al. in Spect. Acta, vol. 20, p. 1763 (1964).

The reaction of the present invention may conveniently be carried out by utilizing a reaction vessel constructed of materials inert to the reactants, for example, nickel, monel or fuzed alumina and equipped with suitable means for introducing the chloryl fluoride and cesium fluoride reactants and for recovering and isolating the cesium difluorochlorate adduct. The initial steps of the reaction typically are conducted at temperatures below about −20° C. at a pressure of 400 to 500 mm. Hg, absolute, for several hours or longer, illustratively 2 to 18 hours, during which period of time the desired cesium difluorochlorate adduct is formed. After completion of the reaction, the excess chloryl fluoride may be removed by warming the reactor to a temperature above about −20° C. thereby vaporizing all of the chloryl fluoride present in the reactor and venting the same therefrom. As may be appreciated by those skilled in the art, the process of the present invention may be conducted in batch, intermittent batch or continuous operation.

The cesium difluorochlorate adduct of the present invention is useful for storing gaseous chloryl fluoride in the solid state, in the purification of chloryl fluoride, and as an intermediate for the preparation of other oxidizing agents such as chlorine dioxide. For example, although chlorine dioxide is a commercially important oxidizer (bleaching agent), it cannot be stored or shipped because it is dangerously explosive and therefore must be manufactured at the location where it is to be used. As above indicated, the cesium difluorochlorate adduct of the present invention liberates chloryl fluoride when heated to a temperature in excess of about 100° C. Chlorine dioxide may be obtained therefrom by passing the chloryl fluoride through sand as is more fully disclosed by Schmeisser et al. in Advances in Inorganic Chemistry and Radiochemistry, vol. 5, p. 60 (1963).

The following examples are illustrative of the product and process of the present invention.

EXAMPLE 1

Preparation of cesium difluorochlorate adduct

About 0.30 grams of activated cesium fluoride were placed in a 15.9 ml. nickel cylinder equipped with a Bourdon gauge and the cylinder was then pressurized with fluorine to a pressure of 30 p.s.i.a. After a period of about 16 hours, the fluorine was removed from the cylinder and 4.02 mmols of chloryl fluoride were condensed onto the cesium fluoride contained in the cylinder at a temperature of −196° C. The cylinder was warmed to −22° C. and held there for 3 hours and then warmed to 25° C. The unabsorbed chloryl fluoride was condensed from the cylinder and was measured. The amount of unabsorbed chloryl fluoride was 2.3 mmols indicating that 1.63 mmols of chloryl fluoride had been absorbed, or that 82% of the cesium fluoride had been converted to the desired cesium difluorochlorate adduct. Elemental analysis of the cesium difluorochlorate adduct showed 10.03% Cl, 16.30% F and 61.55% Cs. The calculated composition, based on 82% conversion, would indicate 13.0% Cl, 15.5% F and 60.0% Cs.

EXAMPLE 2

Activation of cesium fluoride

The cesium fluoride reactant employed in Example 1 was prepared in the following manner:

A slurry of 20 grams of anhydrous cesium fluoride (commercially available from the American Potash and Chemical Corporation, Los Angeles, California) in 100 ml. acetonitrile was placed in an evacuated, 150 ml. Fischer-Porter "aerosol compatibility tube" equipped with a Bourdon gauge. Hexafluoroacetone gas was slowly added to the tube, causing the cesium fluoride gradually to dissolve and thereby form a soluble $Cs^+OCF(CF_3)_2^-$ salt. Introduction of the hexafluoroacetone was discontinued when it was observed that the gas was no longer being absorbed and, at this point, it was noted that all solids were in solution. Acetonitrile and excess hexafluoroacetone were then removed from the tube under a vacuum of 10 to 1 mm. Hg, absolute and the remaining solid $Cs^+OCF(CF_3)_2^-$ salt was heated to 100° C. under a vacuum of 0.05 mm. Hg, absolute for a period of about 24 hours to liberate the hexafluoroacetone. After essentially all of the solid $Cs^+OCF(CF_3)_2^-$ salt was decomposed and hexafluoroacetone driven off, there remained a finely divided cesium fluoride in the active form, which was suitable for reaction with chloryl fluoride in accordance with the present process.

EXAMPLE 3

Activation of cesium fluoride by pulverization 15 grams of an anhydrous commercially available cesium fluoride were placed in a Spex Mixer Mill (Spex Industries, Incorporated, Scotch Plains, N.J., catalog No. 8000) equipped with a tungsten carbide lined capsule of approximately 100 ml. volume and a tungsten carbide ball. The anhydrous cesium fluoride was shaken vigorously in said mill for a period of about 4 hours, after which there was obtained a very finely divided cesium fluoride material in the active form. When the cesium fluoride activated by the procedure of the present example is reacted with chloryl fluoride in the manner described in Example 1, essentially identical results as reported in Example 1, above, are obtained.

EXAMPLE 4

Preparation and decomposition of cesium difluorochlorate adduct

In a 15.9 ml. reactor (nickel cylinder equipped with a Bourdon gauge) there was placed 0.30 gram cesium fluoride actiyated by the procedure outlined in Example 2 above and the cylinder was then pressurized with fluorine to a pressure of 30 p.s.i.a. After standing for a period of about 1 hour at 25° C., the fluorine was removed and 4.02 mmols chloryl fluoride were condensed onto the cesium fluoride at a temperature of −196° C. The reactor was warmed to −22° C. and held there for a period of about 3 hours, after which the reactor was warmed to 25° C. and the unabsorbed chloryl fluoride was condensed into a calibrated bulb and measured. Of the original 4.02 mmols chloryl fluoride, 2.69 mmols were recovered, which showed that 1.33 mmols of chloryl fluoride was absorbed, or that 68 mole-percent of the cesium fluoride had been converted to $CsClO_2F_2$. The $CsClO_2F_2$ in the reactor was then heated to 100° C., thereby releasing 1.00 mmol chloryl fluoride. The recovered chloryl fluoride was then combined with the unabsorbed chloryl fluoride and the cyclo of absorption of the chloryl fluoride at −22° C. and liberation of absorbed chloryl fluoride at 100° C. was repeated 5 additional times, using the same chloryl fluoride and cesium fluoride throughout. The results obtained are reproduced in Table I below:

TABLE I

| Cycle | ClO$_2$F absorbed (mmols) | ClO$_2$F liberated (mmols) |
|---|---|---|
| 1 | 1.33 | 1.00 |
| 2 | 0.93 | 0.93 |
| 3 | 0.74 | 0.74 |
| 4 | 0.67 | 0.33 |
| 5 | 0.47 | 0.80 |
| 6 | | 0.60 |

After the last cycle, the gas liberated at 100° C. was examined by infrared spectroscopy and found to be pure chloryl fluoride. An elemental analysis of the solid remaining after heating at 100° C. gave the following results: 14.87% F, 3.27% Cl, 78.54% Cs, 00.00% Ni. These results indicate that the solid sample consisted essentially of cesium fluoride.

Although certain preferred embodiments of the invention have been disclosed for purposes of illustration, it will be evident that various changes and modifications may be made therein without departing from the scope and spirit of the invention.

We claim:
1. As a novel composition of matter, cesium difluorochlorate having the formula $CsClO_2F_2$.
2. A process for preparing $CsClO_2F_2$ which comprises reacting an activated cesium fluoride with chloryl fluoride under anhydrous conditions and recovering $CsClO_2F_2$ from the resulting reaction mass.
3. The process of claim 2 in which the reaction is effected at a temperature in the range of $-100°$ C. to $200°$ C.
4. The process of claim 2 in which the reaction is effected at a temperature in the range of $-30°$ to $25°$ C. and a pressure sufficient to maintain at least a portion of the chloryl fluoride in the liquid state.
5. The process of claim 2 wherein the activated cesium fluoride is obtained by decomposition of a cesium-hexafluoroacetone adduct having the formula

$$Cs^+OCF(CF_3)_2^-$$

6. The process of claim 2 wherein the activated cesium fluoride is obtained by pulverization of cesium fluoride.

References Cited
UNITED STATES PATENTS 3,143,391   8/1964   Hurley et al. _____ 23—267

OTHER REFERENCES

Mitra, "Zeitschrift fur Anorganische und Allgemeine Chemie," Band 340, November 1965, pp. 110–112.

OSCAR R. VERTIZ, *Primary Examiner.*

HERBERT T. CARTER, *Assistant Examiner.*

U.S. Cl. X.R.

23—367